United States Patent
Lin

(10) Patent No.: US 10,697,423 B2
(45) Date of Patent: Jun. 30, 2020

(54) METHOD TO ENHANCE OPERATION EFFICIENCY OF WATER TURBINES AND TO REDUCE CAVITATION OF COMPONENTS THEREOF

(71) Applicant: Zuei-Ling Lin, Taipei (TW)

(72) Inventor: Zuei-Ling Lin, Taipei (TW)

( * ) Notice: Subject to any disclaimer, the term of this patent is extended or adjusted under 35 U.S.C. 154(b) by 71 days.

(21) Appl. No.: 16/181,531

(22) Filed: Nov. 6, 2018

(65) Prior Publication Data
US 2020/0141380 A1 May 7, 2020

(51) Int. Cl.
*F03B 3/02* (2006.01)
*F03B 15/08* (2006.01)
*F03B 11/00* (2006.01)
*F03B 13/10* (2006.01)

(52) U.S. Cl.
CPC ............ *F03B 15/08* (2013.01); *F03B 11/004* (2013.01); *F03B 13/10* (2013.01)

(58) Field of Classification Search
CPC ....... F03B 11/002; F03B 11/004; F03B 11/04; F05B 2260/64
See application file for complete search history.

(56) References Cited

U.S. PATENT DOCUMENTS

| | | | | |
|---|---|---|---|---|
| 3,658,436 A | * | 4/1972 | Oishi ..................... | F03B 15/18 415/1 |
| 3,945,754 A | * | 3/1976 | Hagiya .................... | F03B 3/02 415/1 |
| 4,047,831 A | * | 9/1977 | Mayo, Jr. .............. | F03B 11/002 415/1 |
| 4,073,594 A | * | 2/1978 | Takagi .................. | F03B 15/005 415/1 |

\* cited by examiner

*Primary Examiner* — Ninh H. Nguyen
(74) *Attorney, Agent, or Firm* — Rosenberg, Klein & Lee

(57) ABSTRACT

A method to dispose at least one air guiding tube between a penstock and a water turbine installed on a dam to form negative pressure at an outlet of the air guiding device by the water kinetic energy produced from high speed of water flow to take in external air for pressurizing, so as to produce a plurality of pressured air bubbles mixed into the water. The water with pressured air bubbles would be decompressed when flowing to an exit of the penstock and has their volumes increased, so as to enhance the water kinetic energy for driving the water turbine more efficiently; meanwhile the method can prevent from production of cavities and further avoid damages of the components of the water turbine from cavitation.

8 Claims, 11 Drawing Sheets

METHOD TO ENHANCE OPERATION EFFICIENCY OF WATER TURBINES AND TO REDUCE CAVITATION OF COMPONENTS THEREOF

BACKGROUND OF THE INVENTION

1. Field of Invention

The present invention relates to a method to enhance operation efficiency of water turbines and to reduce cavitation of components thereof.

2. Description of the Related Art

As shown in FIG. 1, a water turbine 300 has a penstock 200 installed on a dam 100 at a hydroelectric power station and the penstock has an entry 201 and an exit 202 for the water to flow through the entry 201 of the water penstock 200 from the top to the bottom of the exit 202 to the water turbine 300, and the water turbine 300 rotates and drives a generator 400 connected thereto to generate electrical energy.

The water turbine can be roughly classified into an impulse turbine and a reaction turbine according to its working principle. Among them, the impulse turbine uses a high-speed water flow impacting runner blade or water bucket 302a for work, and the main representative model is a Pelton Turbine 300a as shown in FIG. 2A. As for the reaction turbine, the pressure and kinetic energy of the water are used to perform work, and the main representative model is shown in FIG. 2B, a Francis Turbine 300b using the runner blades 302b, and FIG. 2C, a Kaplan Turbine 300c using a spiral propeller blade 302c.

However, in the above-mentioned one type of water turbine, the water head position can be used to drive the runner blades, and the outer structure can be roughly divided into: non-closed casing 301a, as shown in FIG. 2A. Pelton Turbine; and closed casing 301b, such as the Francis Turbine shown in FIG. 2B, and the Kaplan Turbine shown in FIG. 2C.

However, there is a special physical phenomenon in the operation of the turbine, that is, the high-speed water flow in the turbine to the guide plate, the impeller and other related parts and accessories, the impact produces high-pressure zone and low-pressure zone, and the potential energy conversion of water in the high-pressure zone for electric energy, when the pressure in the low pressure zone is lower than the vapor pressure of water, the water vaporizes and generates air bubbles, which causes erosion of the components of the turbine, thus affecting the efficiency and service life of the water turbine. However, in order to prevent cavitation of water turbine-related parts and accessories, only special metal materials resistant to cavitation can be used, but they are expensive and difficult to process, such as special stainless steel materials such as ASTM A487 stainless steel.

Hence, if the design is too complicated to improve the above problems, or the design of the structure of the turbine will be changed, it is not easy to complete, and it is costly. Therefore, how to manufacture a water turbine at a low cost, thereby increasing the power of the water turbine and suppressing the occurrence of cavitation of related components such as turbine components, is a problem to be solved by the present invention.

SUMMARY OF THE INVENTION

A primary objective the present invention is to provide a method for improving the power generation efficiency of a water turbine and suppressing cavitation of a turbine component.

To achieve the objectives mentioned above, the technical means adopted by the present invention including: having a penstock installed on a dam at a hydroelectric power station, said penstock having an entry at an upper end and an exit at a lower end; having a water turbine with a casing and a plurality of runner blades disposed inside said casing, said water turbine connected to said exit of the penstock for driving said runner blades by hydropower produced by the water flowing out from the penstock, wherein an air guiding device is disposed between the penstock and the plurality of runner blades of the water turbine, said air guiding device including at least one air guiding tube penetrating into a pipe section formed by the exit of the penstock and a connecting section between the exit and the water turbine, said air guiding tube having an inlet at an upper end for guiding in external air and an outlet at a lower end penetrating into the pipe section; and an air control valve is disposed in the air guiding tube between the inlet and the outlet; and forming negative pressure at the outlet of the air guiding tube by high speed of the water flowing out from the penstock to take in external air and then forming a plurality of pressured air bubbles in the water; whereby the plurality of pressured air bubbles are produced by a head of the water and then mixed into the water by the air guiding device, driving the runner blades by the water flow as volumes of the pressured air bubbles increased at a decompressed area of the water turbine, so as to enhance operation efficiency of the water turbine with the enhanced water kinetic energy and to reduce formation of cavities in the water and prevent components of the water turbine from damages caused by cavitation.

In a preferred embodiment, the water turbine is a reaction turbine, having a closed casing and a connecting section connected to the exit of the penstock, and the air guiding device includes at least one air guiding tube which is arranged on the pipe section before the exit or on the connecting section.

According to the structures disclosed, the air guiding device further includes an annulus periphery and an annular output passage formed inside the annulus periphery, and the at least one air guiding tube is disposed on the annulus periphery.

According to the structures disclosed, the reaction turbine includes a Francis turbine or a Kaplan turbine.

In another preferred embodiment, the water turbine is an impulse turbine and the exit of the penstock is extended to the plurality of runner blades of the impulse turbine as the air guiding device is disposed at a front of the exit. Furthermore, the impulse turbine includes a Pelton turbine.

According to the structures disclosed, the air control valve is either manual or automatic.

According to the structures disclosed, the air control valve is closed when the water flow in the penstock is not flowing at high speed, and the air control valve is opened when the water flow in the penstock is flowing at high speed.

With structures disclosed above, the present invention can provide an air guiding device disposed between the penstock and the plurality of runner blades of the water turbine, and use the Bernoulli's Principle and the reservoir without changing any original design inside the water turbine. A high-speed water flow can be generated by the water head.

The high-speed water flow forms a negative pressure at the air guiding device to absorb the external air and mix with the water to produce a water flow containing a large amount of pressurized bubbles; since the cavitation phenomenon is mainly due to high speed the water flow impacts the runner blade, and the low pressure part is lower than the vapor pressure of the water, causing the water to vaporize and generate air bubbles, which causes erosion of the relevant components inside the water turbine, thus affecting the power and service life of the water turbine; since the high pressure bubble of the invention has compressibility, it will not break when compressed, but conventionally, cavities in the water flow cavitation will rupture. Therefore, the pressured air bubbles of the present invention can not only increase the force of the water flow to enhance the operation efficiency of the water turbine, but also contain pressurized air bubbles in the water flow and suppress the occurrence of cavitation in the low pressure area, so as to prevent the occurrence of cavitation in the runner blades and related components.

DETAILED DESCRIPTION OF THE PREFERRED EMBODIMENT

The following provides a preferred embodiment of the technical features of the present invention; however, there are many types of water turbines, and the shapes and structures are not completely the same. Therefore, although only the preferred embodiment is described, the technical means used thereof are the same, so they are not described one by one. The water turbine parts and accessories described below include related components such as water turbine parts and accessories. Another runner blade may also be referred to as an impeller.

Figure 1:
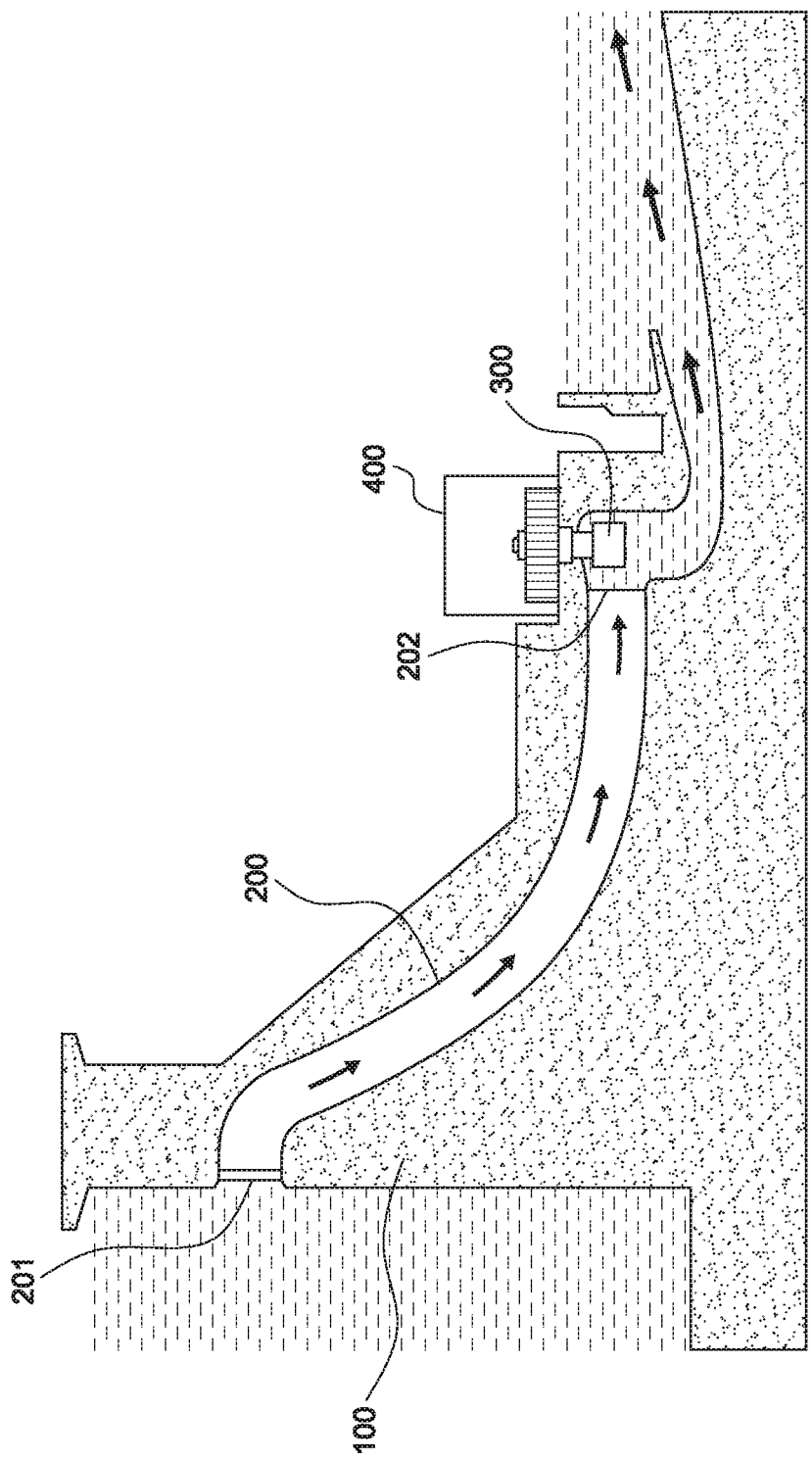
FIG. 1 is a schematic diagram of arrangement of a hydroelectric power station according to the prior art.
Figure 2:
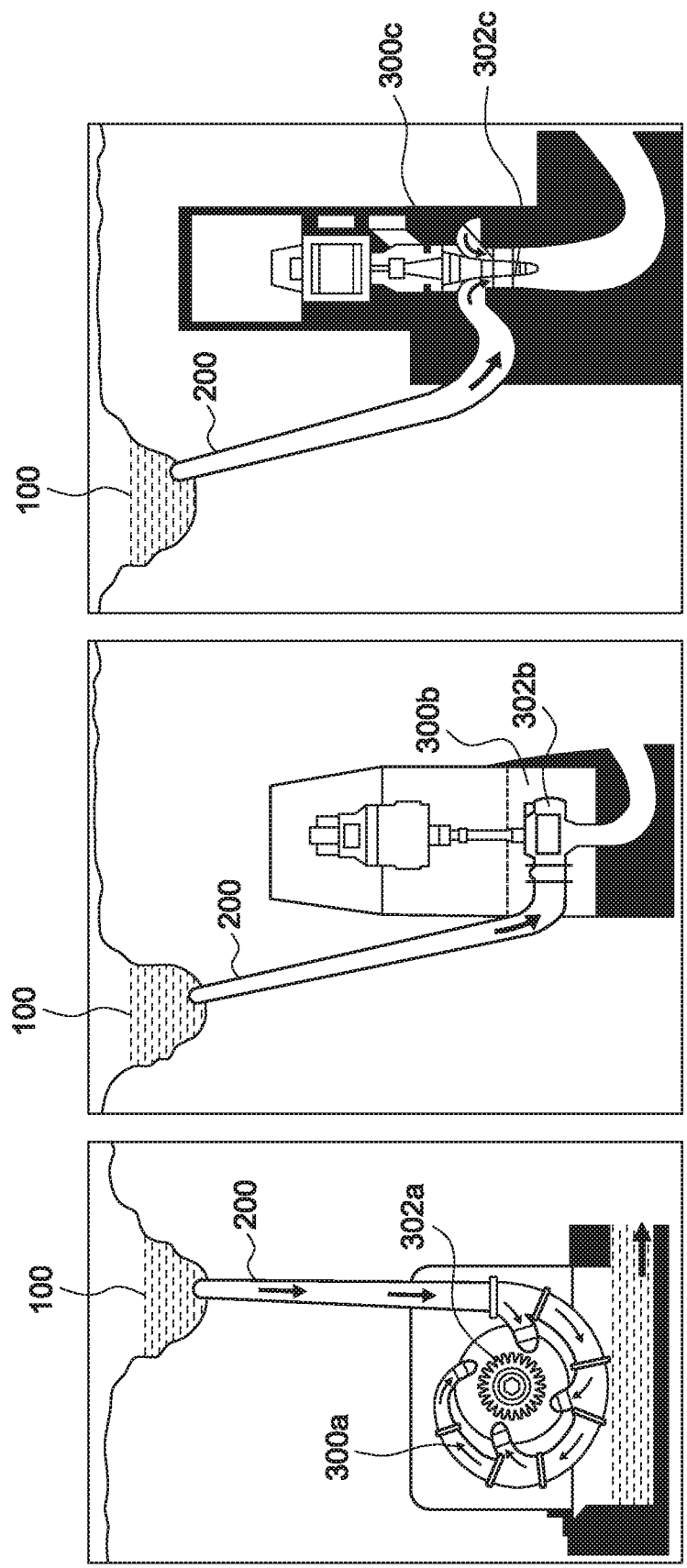
FIG. 2A is a schematic diagram illustrating a structure of a conventional Francis turbine.
FIG. 2B is a schematic diagram illustrating a structure of a conventional Kaplan turbine.
FIG. 2C is a schematic diagram illustrating a structure of a conventional Pelton turbine.
Figure 3:
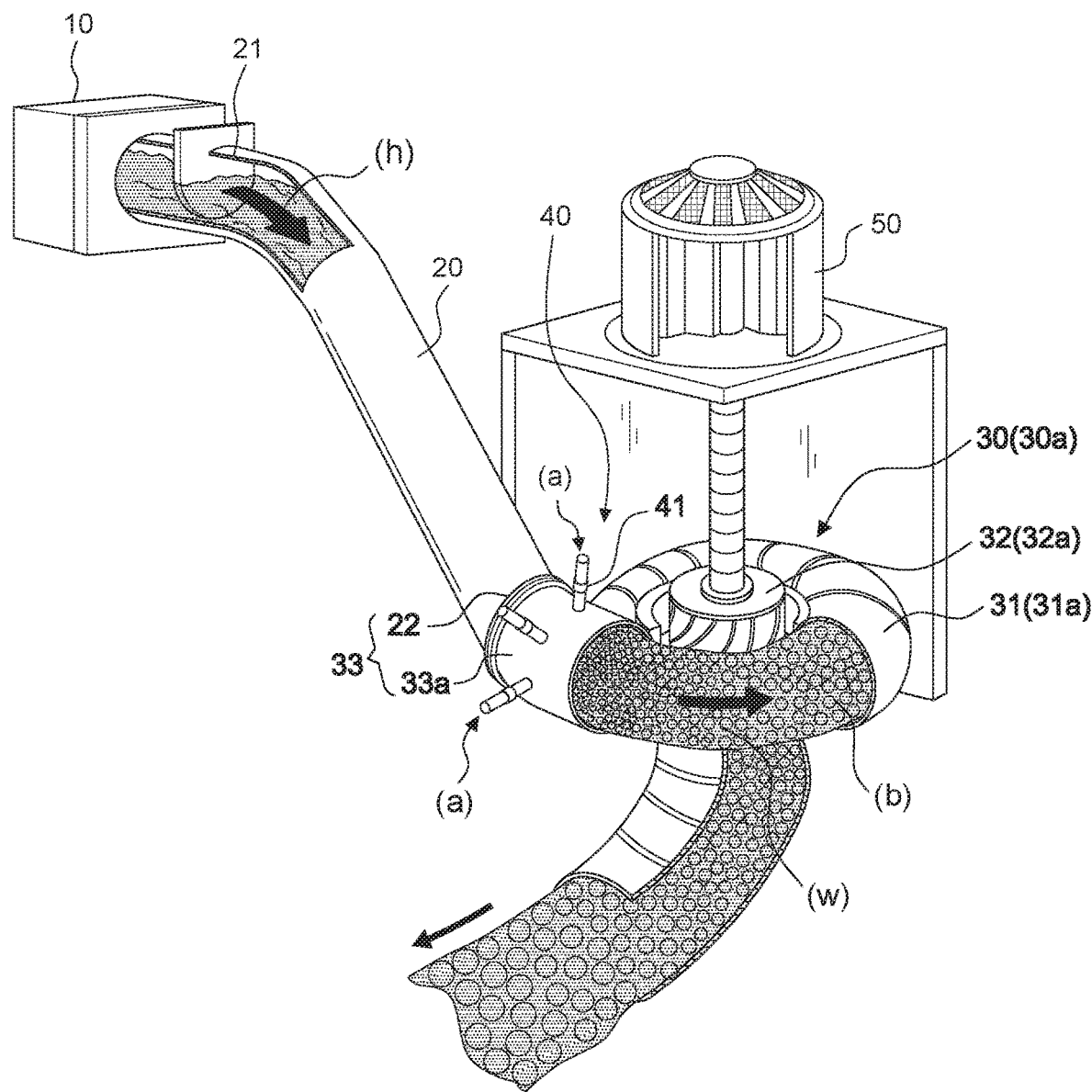
FIG. 3 is a perspective view of structure of the present invention in an embodiment with a water turbine having a closed casing.

Please referring to an embodiment in the following with reference to FIGS. 3-10. A method to enhance operation efficiency of water turbines and to reduce cavitation of components thereof, comprising: having a penstock 20 installed on a dam 10 at a hydroelectric power station, said penstock having an entry 21 at an upper end and an exit 22 at a lower end; having a water turbine 30 with a casing 31 and a plurality of runner blades 32 disposed inside said casing 31, said water turbine 30 connected to said exit 22 of the penstock 20 for driving said runner blades 32 by hydropower produced by the water flowing out from the penstock 20, the runner blades 32 is driven by the water flow pressure of the penstock 20 to drive a generator 50, however, the device and the basic structure of the general hydroelectric power station are formed, and the principle and function are not described herein. As shown in FIG. 3 and FIG. 4, the pipe section 33 described below in the present invention refers to a position which is provided before the exit 22 and a section of the connecting section 33a.

wherein an air guiding device 40 is disposed between the penstock 20 and the plurality of runner blades 32 of the water turbine 30, said air guiding device 40 including at least one air guiding tube 41 penetrating into a pipe section 33 formed by the exit 22 of the penstock 20 and a connecting section 33a between the exit 22 and the water turbine 30, said air guiding tube 41 having an inlet 411 at an upper end for guiding in external air and an outlet 412 at a lower end penetrating into the pipe section 33; and an air control valve 413 is disposed in the air guiding tube 41 between the inlet 411 and the outlet 412.

As shown in FIG. 3, in a preferred embodiment, the water turbine 30 is a reaction turbine 30a. The reaction turbine 30a includes a Francis turbine or a Kaplan turbine. in the present embodiment, the reaction turbine 30a is a Francis turbine; having a closed casing 31a and a connecting section 33a connected to the exit 22 of the penstock 20, and the air guiding device 40 includes at least one air guiding tube 41 which is arranged on the pipe section 33a before the exit 22 or on the connecting section 33a.

Figure 4A:
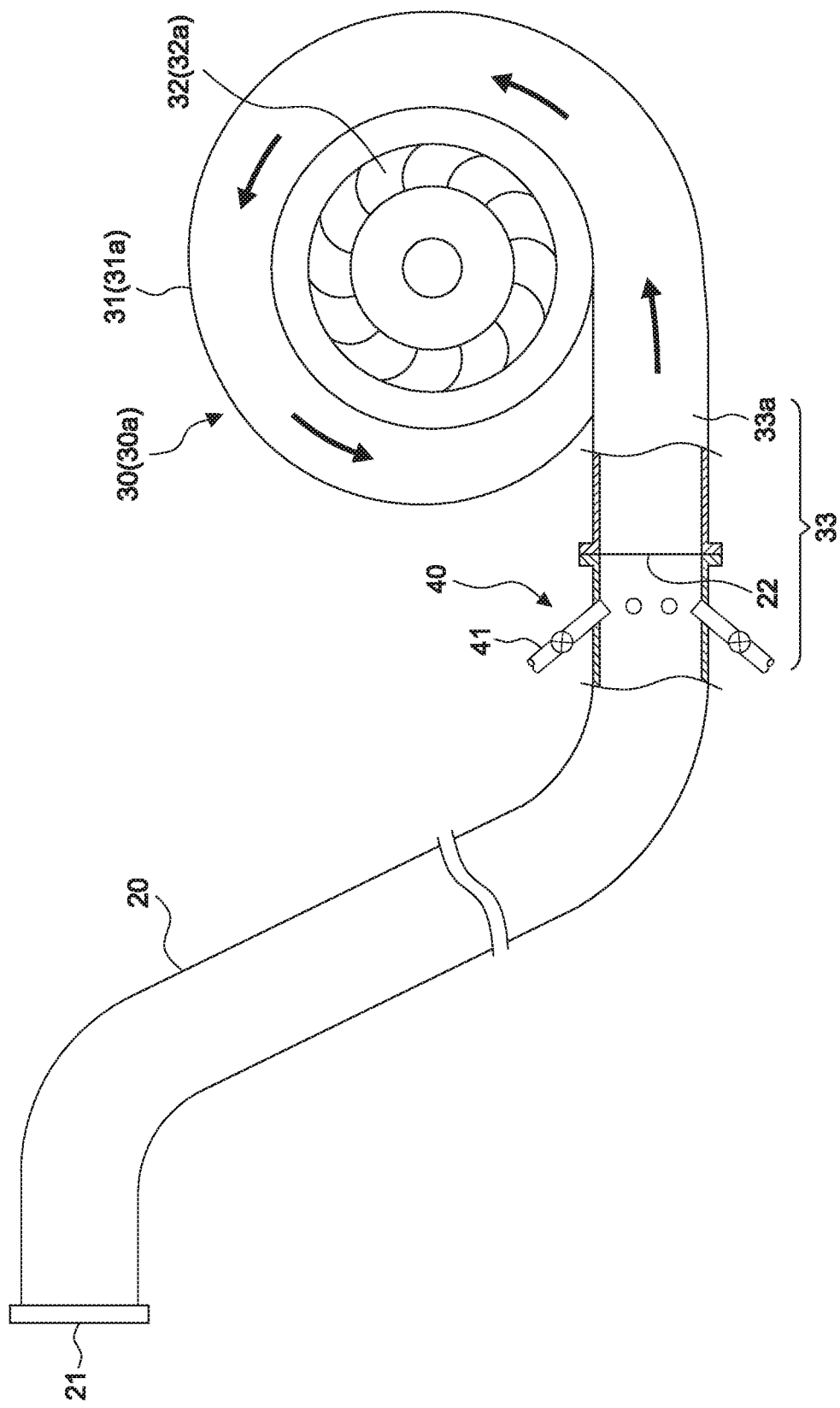
FIG. 4A is a schematic diagram of the present invention in an embodiment, showing an air guiding device disposed before an exit of a penstock thereof.
Figure 4B:
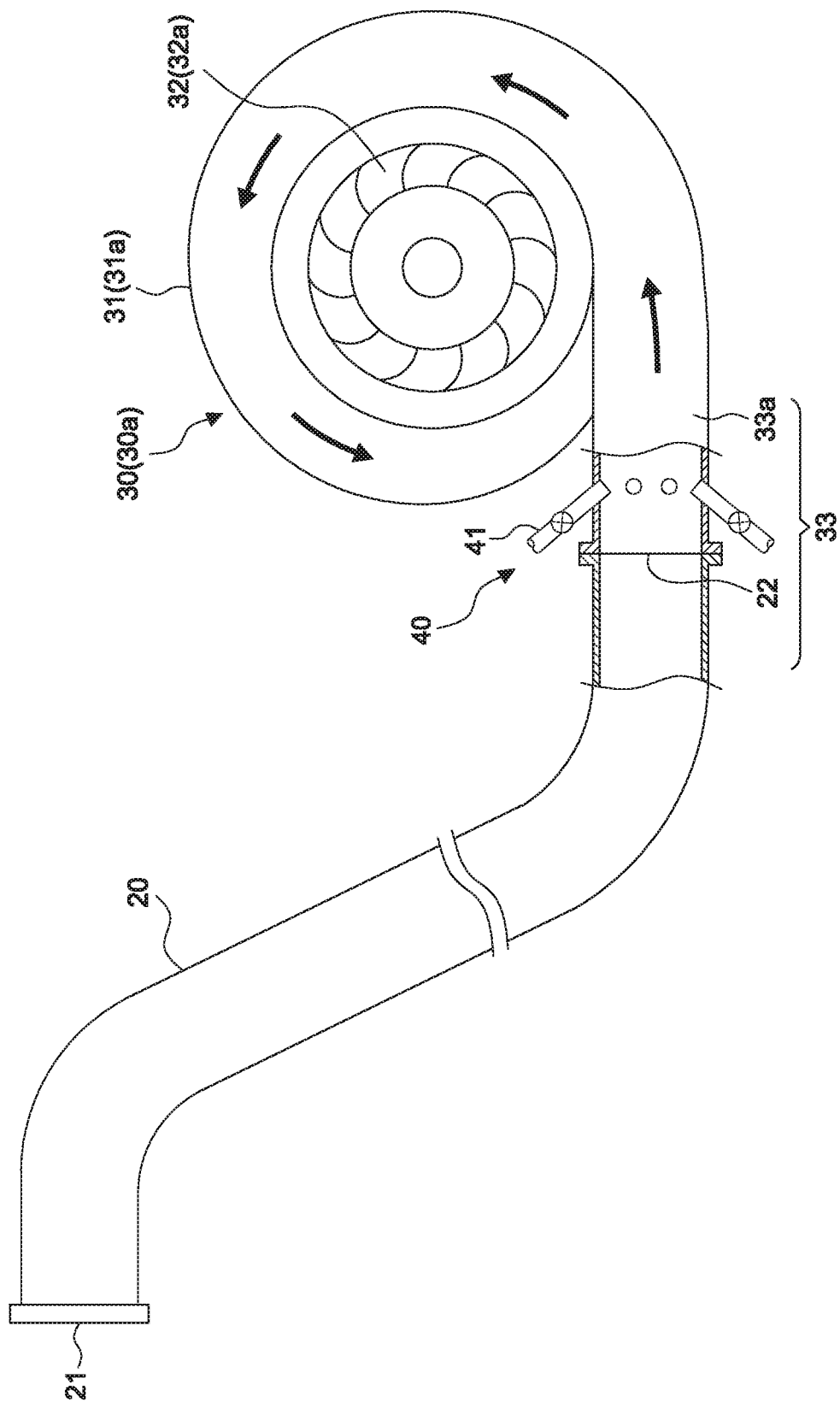
FIG. 4B is a schematic diagram of the present invention in an embodiment, showing the air guiding device disposed on a pipe section of a water turbine thereof.
Figure 5:
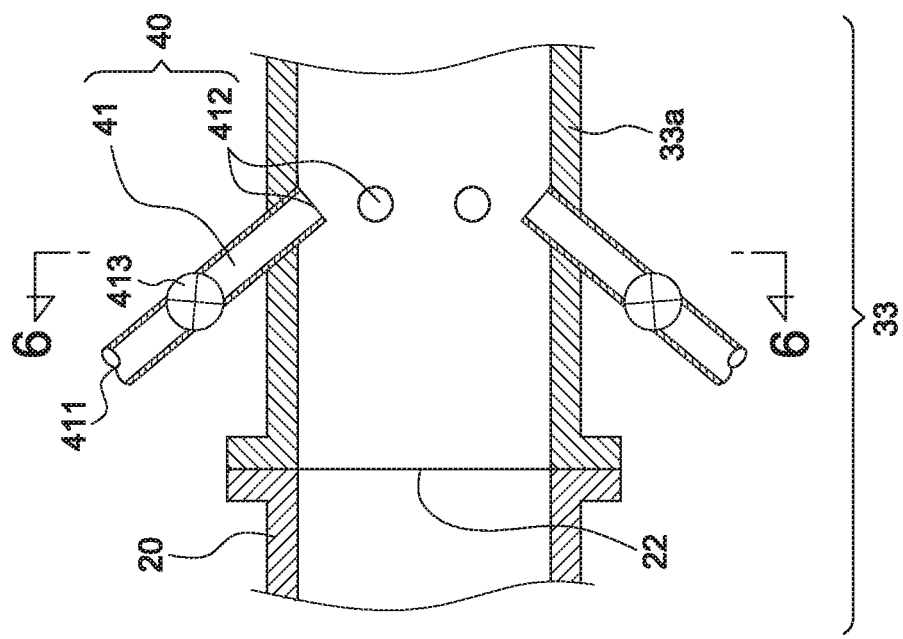
FIG. 5 is a partially enlarged view of FIG. 4B.
Figure 6:
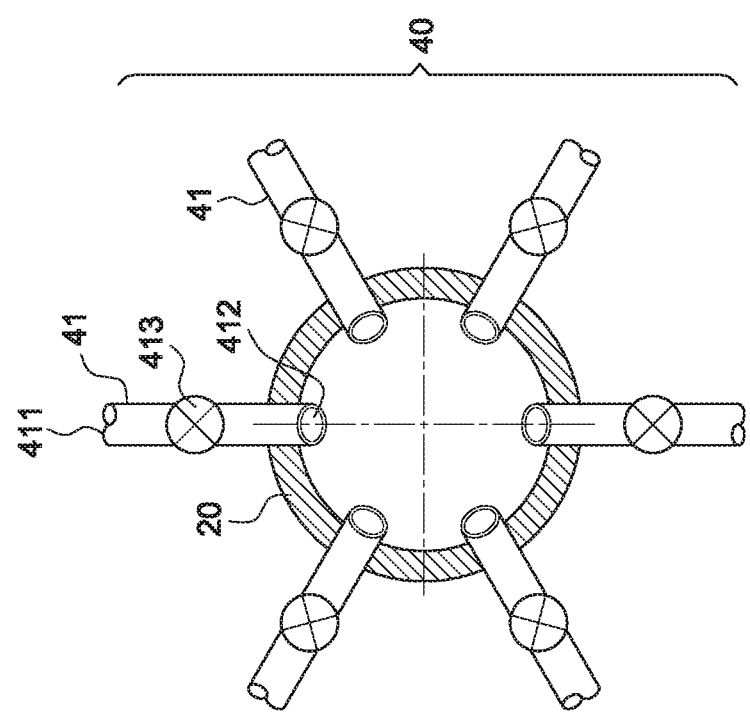
FIG. 6 is a sectional view along line 6-6 of FIG. 5.

As shown in FIG. 4A, in the present embodiment, the air guiding device 40 is disposed on the periphery of the exit 22 of the penstock 20, but is not limited thereto; the air guiding device 40 may also be as shown in the FIG. 4B, disposed on the connecting section 33a; the air guiding device 40 of the present invention is disposed on the periphery of the exit 22 of the penstock 20, or is disposed in the connecting section 33a, it can be implemented.

In the present embodiment, the air control valve 413 is either manual or automatic. The air control valve 413 is that when the water flow from the top of the penstock 20 starts to drive the runner blades 32, the high-speed water flow state has not yet been reached, so that the negative pressure generated by the outlet 412 cannot introduce the air at this time, so the air control valve 413 must be closed, otherwise the water flow will be ejected from the outlet 412 and poured into the inlet 411. Later, when the penstock 20 reaches the high-speed water flow state, the air control valve 413 is opened, and at this time, the negative pressure is formed at the outlet 412 of the air guiding tube 41 by high-speed water flow h to take in external air a and then form a plurality of pressured air bubbles b in the water w.

In a preferred embodiment, the outlet 412 is positioned adjacent to the exit 22 because the exit 22 has a relatively fast flow of water at this location. The outlet 412 disclosed in the present invention may have a circular hole shape, but is not limited thereto, and may be other shapes. Further, in the present embodiment, the outlet 412 is inclined rearward. This is a preferred embodiment. It has been found in an experiment that the outlet 412 is disposed perpendicular to the penstock 20, and can also be implemented, that is, the high pressure water flow can also generate a negative pressure suction force at the outlet 412.

Figure 7:
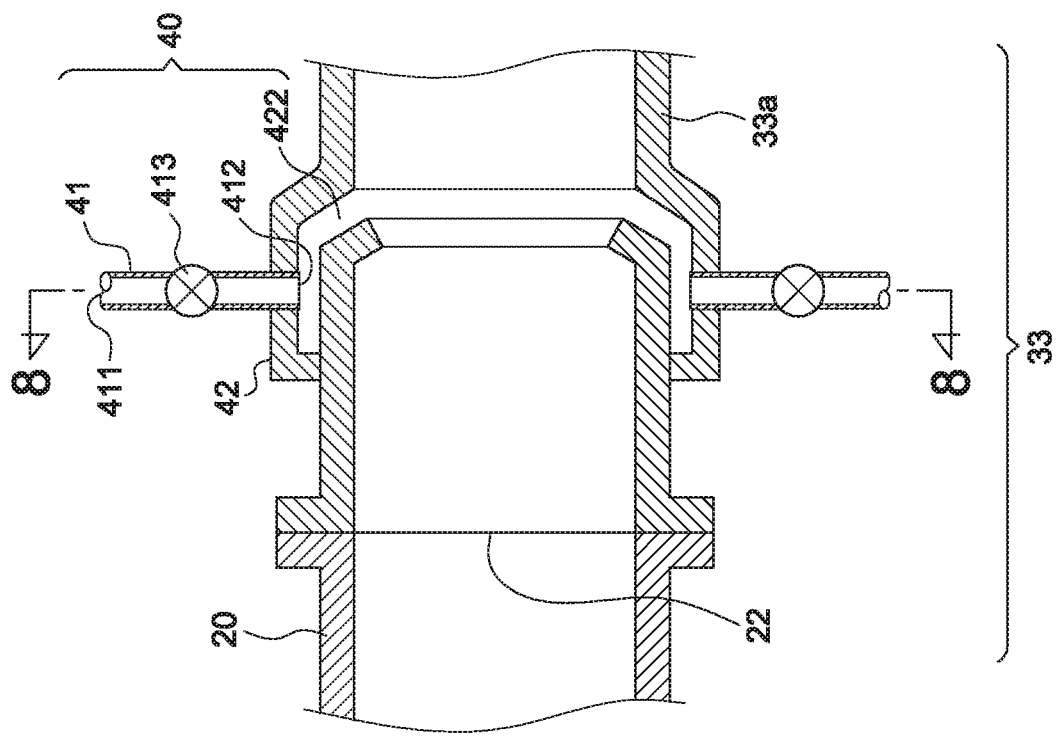
FIG. 7 is a sectional view of a structure of the air guiding device in another embodiment.
Figure 8:
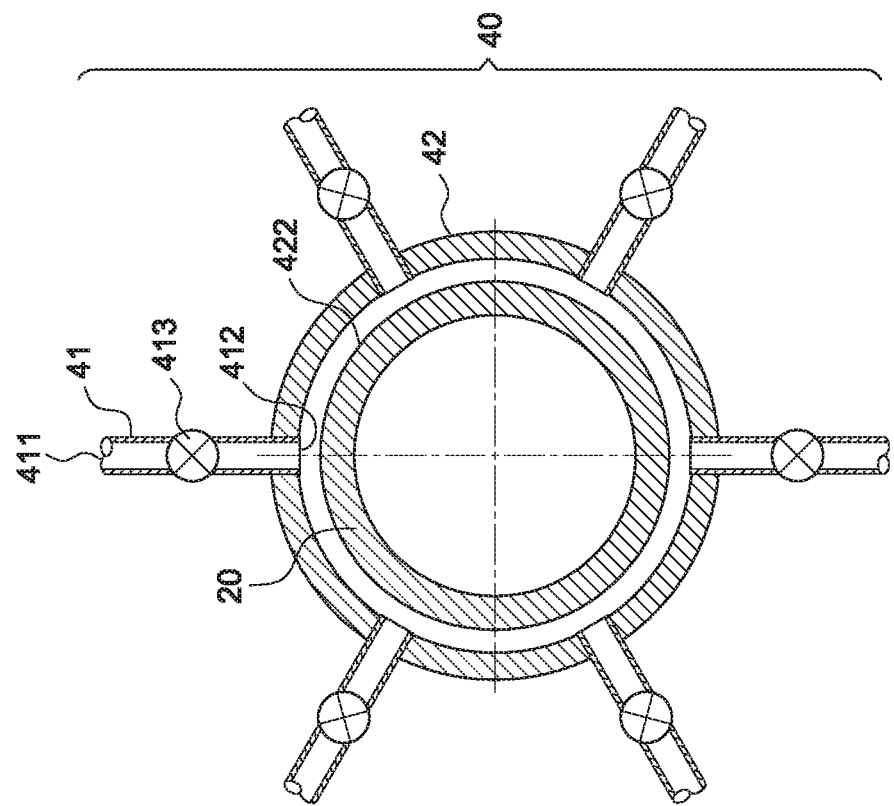
FIG. 8 is a sectional view along line 8-8 of FIG. 7.

As shown in FIG. 7 and FIG. 8, in the present embodiment, the air guiding device 40 further includes an annulus periphery 42 and an annular output passage 422 connecting to the penstock 20 or to the pipe section 33a of the water turbine 30, and the at least one air guiding tube 41 is disposed on the annulus periphery 42. Then the negative pressure formed at both the annular output passage 422 and the outlet 412 of the air guiding tube 41 by high-speed water flow h out from the penstock 20 takes in external air a and then forms a plurality of pressured air bubbles b in the water w.

Figure 9:
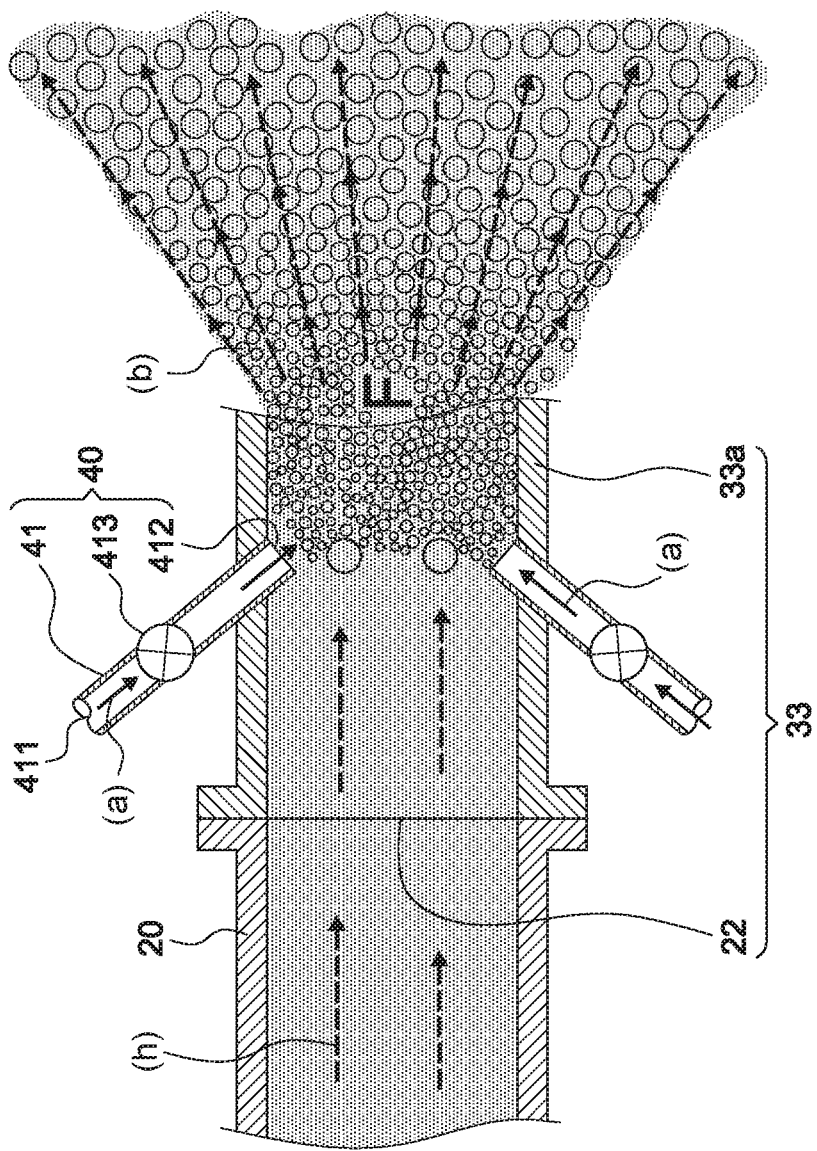
FIG. 9 is a schematic diagram illustrating an application example of the present invention in an embodiment.

As shown in FIG. 9, is a schematic diagram illustrating an application example of the present invention in an embodiment; the present invention use the plurality of pressured air bubbles b are produced by a head of the water and then mixed into the water w by the air guiding device 40, driving the runner blades 32 by the water flow h as volumes of the pressured air bubbles b increased at a decompressed area of the water turbine 30, so as to enhance operation efficiency of the water turbine 30 with the enhanced water kinetic energy and to reduce formation of cavities in the water and prevent components of the water turbine 30 from damages caused by cavitation.

Figure 10:
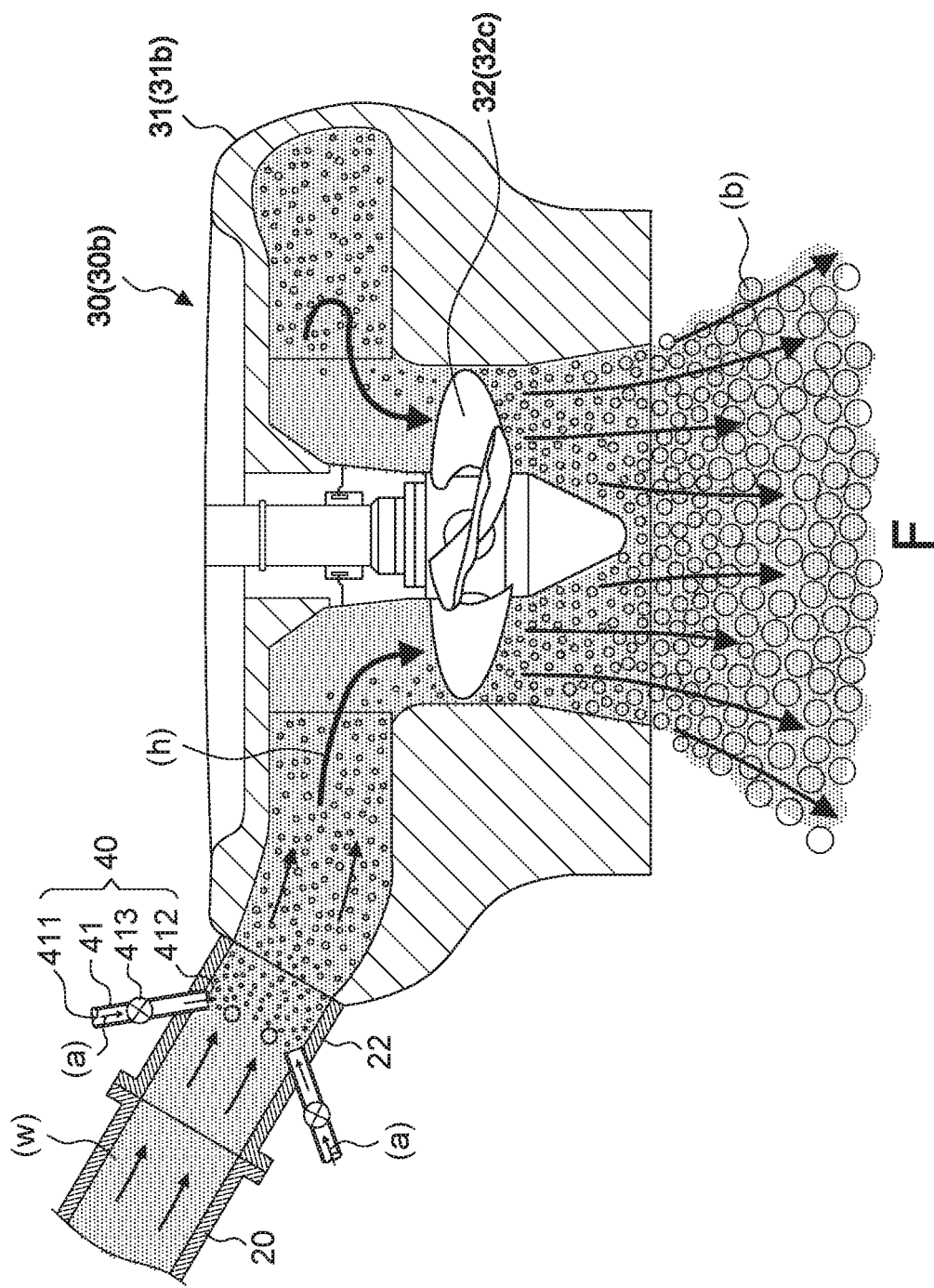
FIG. 10 is another schematic diagram illustrating the application example of the present invention in an embodiment.

As shown in FIG. 10, is another schematic diagram illustrating the application example of the present invention in an embodiment; in the present embodiment, the water turbine 30 is a Kaplan turbine 30b. It also belongs to the type of the reaction turbine 30a, and has a closed casing 31b. The difference is only that the runner blade 32 is a spiral rotating blade 32c, so the air guiding device 40 can also be applied, and is used in France turbine, the same effect cannot be described.

Figure 11:
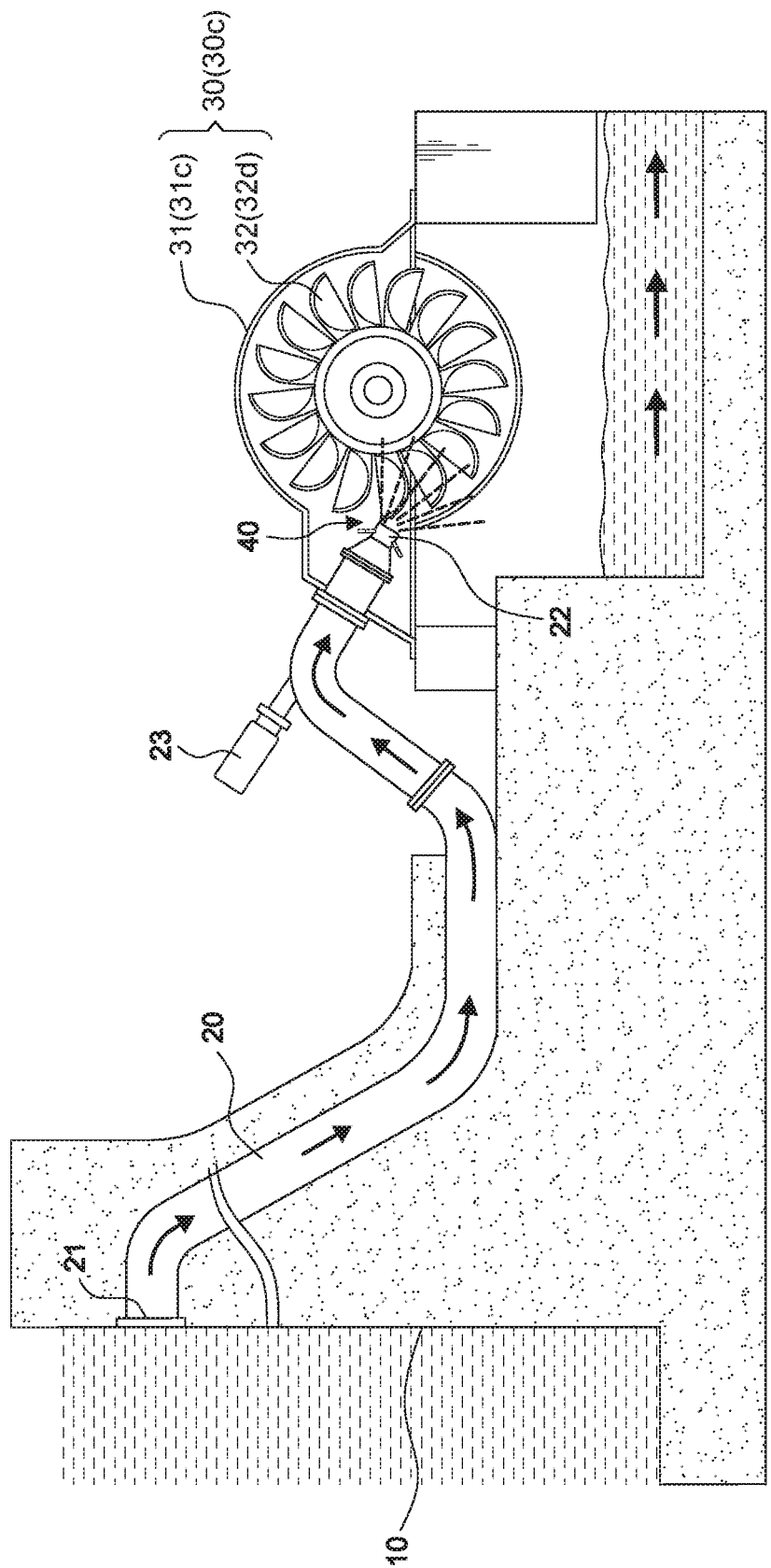
FIG. 11 is a schematic diagram of the present invention in another embodiment, showing the water turbine having an open casing.
Figure 12:
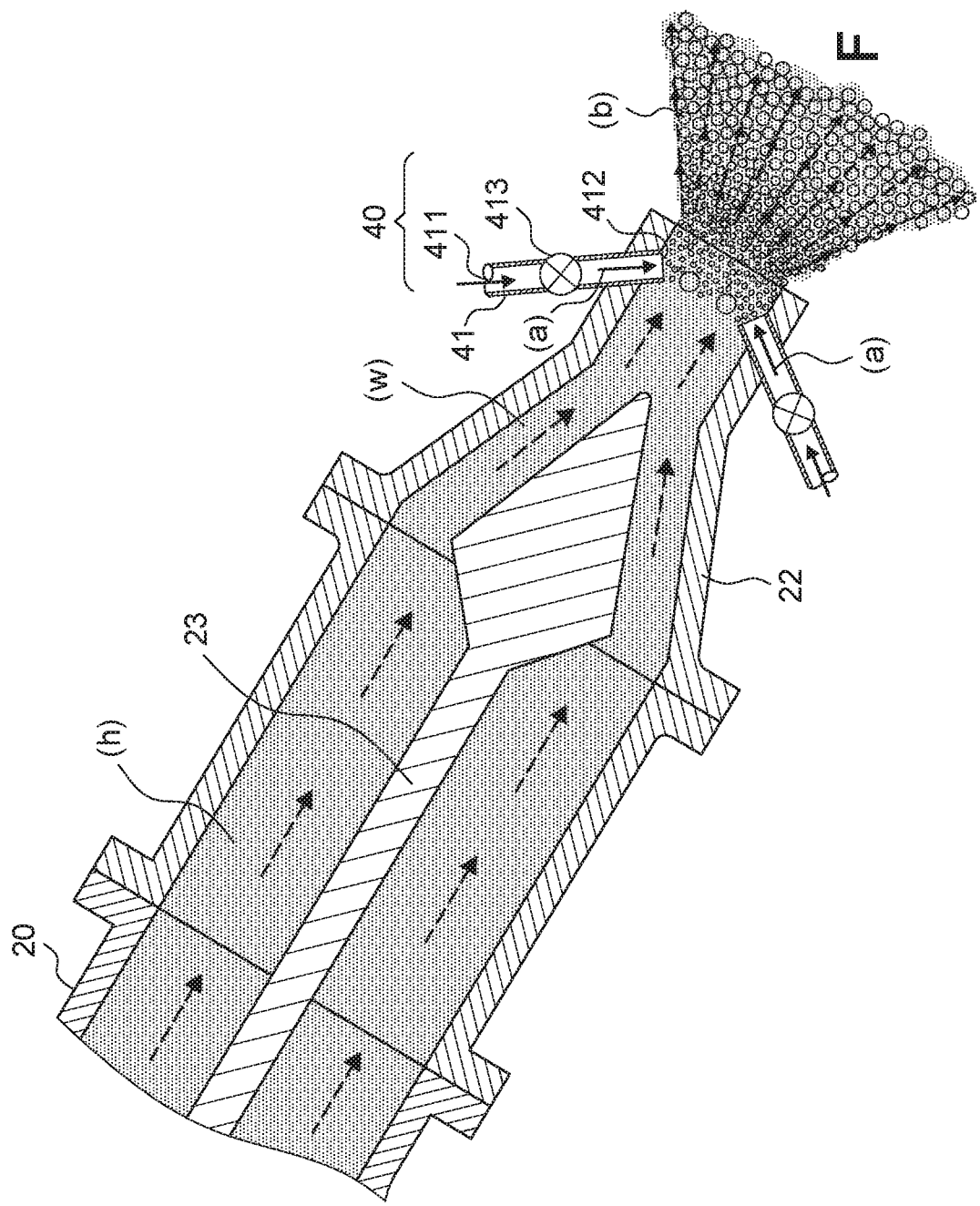
FIG. 12 is a schematic diagram illustrating an application example of the present invention in another embodiment.

FIG. 11 is a schematic diagram of the present invention in another embodiment, showing the water turbine having an open casing; and FIG. 12 is a schematic diagram illustrating an application example of the present invention in another embodiment. The same structure as the previous embodiment is denoted by the same reference numeral, and the difference is only that the water turbine 30 is an impact turbine 30c, belonging to the non-closed casing 31c, and the exit 22 of the penstock 20 extends to the impact. The periphery of the spiral rotating blade 32c of the impact turbine 30c, and the air guiding device 40 is provided on the periphery of the exit 22. In the present embodiment, the impact turbine 30c includes a Pelton Turbine, and the casing 31 is a non-closed casing 31c, and the runner blade 32 is a bucket-shaped impeller 32d. In addition, a regulating valve 23 is disposed in front of the exit 22 of the penstock 20 for adjusting the water flow rate of the exit 22. However, the regulating valve 23 belongs to the prior art, and is not the patent of the present invention. Therefore, whether it is a commercially available type of water turbine, such as a closed casing of Francis turbine, a Kaplan turbine, and a non-closed casing of Pelton turbine; the technical means of the air guiding device 40 of the present invention are.

In conclusion, the present invention has features described as following:

1. Application of Bernoulli's principle: a high-speed water flow h can be produced by using the water head position, and a negative pressure is formed at the outlet 412 of the air guiding device 40 by the high-speed water flow h to take in external air a and mix with water w to form the plurality of pressured air bubbles b, the plurality of pressured air bubbles b in the water flow, the energy source is derived from the conversion of the kinetic energy of the head, so there is no need for additional energy and therefore has economic benefits.

2. The principle of compressibility of air and Boyle's law: the volume of compressible air is inversely proportional to the applied pressure, i.e., $P_1V_1=P_2V_2$, when the pressure increases, the volume becomes smaller, and the pressure decreases. Become bigger. For example: $2P_1 1V_1=1P_2 2V_2$. Since water is incompressible, it becomes a water flow bubble having compressibility when the bubbles are mixed in the water flow. Therefore, the present invention contains the plurality of pressured air bubbles b, has compressibility, and is only a volume change upon compression. But it won't break.

3. The plurality of pressured air bubbles b will not break: the cavitation phenomenon is mainly caused by the high-speed water flow impinging on the runner blade (the impeller guide), and the low-pressure part is caused by the vaporization of the water due to the vapor pressure lower than the water. Corrosion of the relevant components inside the turbine, thus affecting the power and service life of the turbine; however, the present invention utilizes the head position energy to produce a high-speed water flow h, and a negative pressure is formed at the outlet 412 of the air guiding device 40 to take in external air a and mix with water w to form the plurality of pressured air bubbles b, and the introduced air bubbles are compressed and the volume is reduced, and when the pressure is gradually lowered near the water outlet, the front and rear pressures are utilized. Since the difference is changed and the instantaneous expansion becomes large, since the plurality of pressured air bubbles b of the present invention has compressibility, it does not break during compression, and the plurality of pressured air bubbles b of the present invention, which is pressurized in the decompression zone. The volume expansion of the bubble not only increases the force of the water flow to increase the power of the turbine, but also contains the plurality of pressured air bubbles b in the water flow, and at the same time suppresses the occurrence of cavitation in the low pressure zone, thereby preventing the rotation of the blade and its related components.

Further, the air guiding device 40 can introduce the gas by an auxiliary means, including the exhaust gas of the hydroelectric power station, and feed it into the air pipe (not shown). Therefore, it belongs to resource recycling and reuse, which will not increase resources and increase costs. Further, if the present invention requires pressurized gas injection and is released from the outlet 412, a higher propulsion power effect can be obtained, so that a plurality of power effects can be obtained with a small amount of.

Although particular embodiments of the invention have been described in detail for purposes of illustration, various modifications and enhancements may be made without departing from the scope of the claims. Accordingly, the invention is not to be limited except as by the appended claims.

What is claimed is:

1. A method to enhance operation efficiency of water turbines and to reduce cavitation of components thereof, comprising:

having a penstock installed on a dam at a hydroelectric power station, said penstock having an entry at an upper end and an exit at a lower end;

having a water turbine with a casing and a plurality of runner blades disposed inside said casing, said water turbine connected to said exit of the penstock for driving said runner blades by hydropower produced by the water flowing out from the penstock;

wherein an air guiding device is disposed between the penstock and the plurality of runner blades of the water turbine, said air guiding device including at least one air guiding tube penetrating into a pipe section formed by the exit of the penstock and a connecting section between the exit and the water turbine, said air guiding tube having an inlet at an upper end for guiding in external air and an outlet at a lower end penetrating into the pipe section; and an air control valve is disposed in the air guiding tube between the inlet and the outlet; and forming negative pressure at the outlet of the air guiding tube by high speed of the water flowing out from the penstock to take in external air and then forming a plurality of pressured air bubbles in the water;

whereby the plurality of pressured air bubbles are produced by a head of the water and then mixed into the water by the air guiding device, driving the runner blades by the water flow as volumes of the pressured air bubbles increased at a decompressed area of the water turbine, so as to enhance operation efficiency of the water turbine with the enhanced water kinetic energy and to reduce formation of cavities in the water and prevent components of the water turbine from damages caused by cavitation.

2. The method as claimed in claim 1, wherein the water turbine is a reaction turbine, having a closed casing and a connecting section connected to the exit of the penstock, and the air guiding device includes at least one air guiding tube which is arranged on the pipe section before the exit or on the connecting section.

3. The method as claimed in claim 2, wherein the air guiding device further includes an annulus periphery and an annular output passage connecting to the penstock or to the pipe section of the water turbine, and the at least one air guiding tube is disposed on the annulus periphery.

4. The method as claimed in claim 2, wherein the reaction turbine includes a Francis turbine or a Kaplan turbine.

5. The method as claimed in claim 1, wherein the water turbine is an impulse turbine and the exit of the penstock is extended to the plurality of runner blades of the impulse turbine as the air guiding device is disposed at a front of the exit.

6. The method as claimed in claim 5, wherein the impulse turbine includes a Pelton turbine.

7. The method as claimed in claim 1, wherein the air control valve is either manual or automatic.

8. The method as claimed in claim 1, wherein the air control valve is closed when the water flow in the penstock is not flowing at high speed, and the air control valve is opened when the water flow in the penstock is flowing at high speed.

\* \* \* \* \*